United States Patent
Rairden, III

[15] 3,655,544
[45] Apr. 11, 1972

[54] REFRACTORY METAL/REFRACTORY METAL NITRIDE RESISTOR FILMS

[72] Inventor: John R. Rairden, III, Niskayuna, N.Y.
[73] Assignee: General Electric Company

[22] Filed: Mar. 2, 1970
[21] Appl. No.: 15,473

[52] U.S. Cl. ....................204/192, 117/201, 117/227
[51] Int. Cl. ....................C23c 15/00
[58] Field of Search ....................117/201, 227; 204/192; 338/308

[56] References Cited

UNITED STATES PATENTS

| | | | |
|---|---|---|---|
| 2,904,452 | 9/1959 | Reichelt | 117/227 |
| 3,301,707 | 1/1967 | Loeb et al. | 117/106 |
| 3,242,006 | 3/1966 | Gerstenberg | 204/192 |
| 3,575,833 | 4/1971 | Gerstenberg et al. | 204/192 |
| 3,529,350 | 9/1970 | Rairden | 117/227 |

*Primary Examiner*—John H. Mack
*Assistant Examiner*—Sidney S. Kanter
*Attorney*—Richard R. Brainard, Paul A. Frank, John J. Kissane, Frank L. Neuhauser, Oscar B. Waddell and Joseph B. Forman

[57] ABSTRACT

Low temperature coefficient of resistance, high resistivity films of a refractory metal/refractory metal nitride are formed by sputtering a tungsten or molybdenum cathode in a chamber containing a mixture of an inert gas and nitrogen wherein nitrogen forms between 0.3 and 3.0 percent of the sputtering chamber pressure. The deposited films characteristically are a mixture of the sputtered metal and at least 5 percent by volume of the metal nitride with films having especially superior electrical characteristics containing the metal nitride in concentrations between approximately 40 and 60 percent by volume of the resistor film.

5 Claims, 4 Drawing Figures

Figures 1, 4:
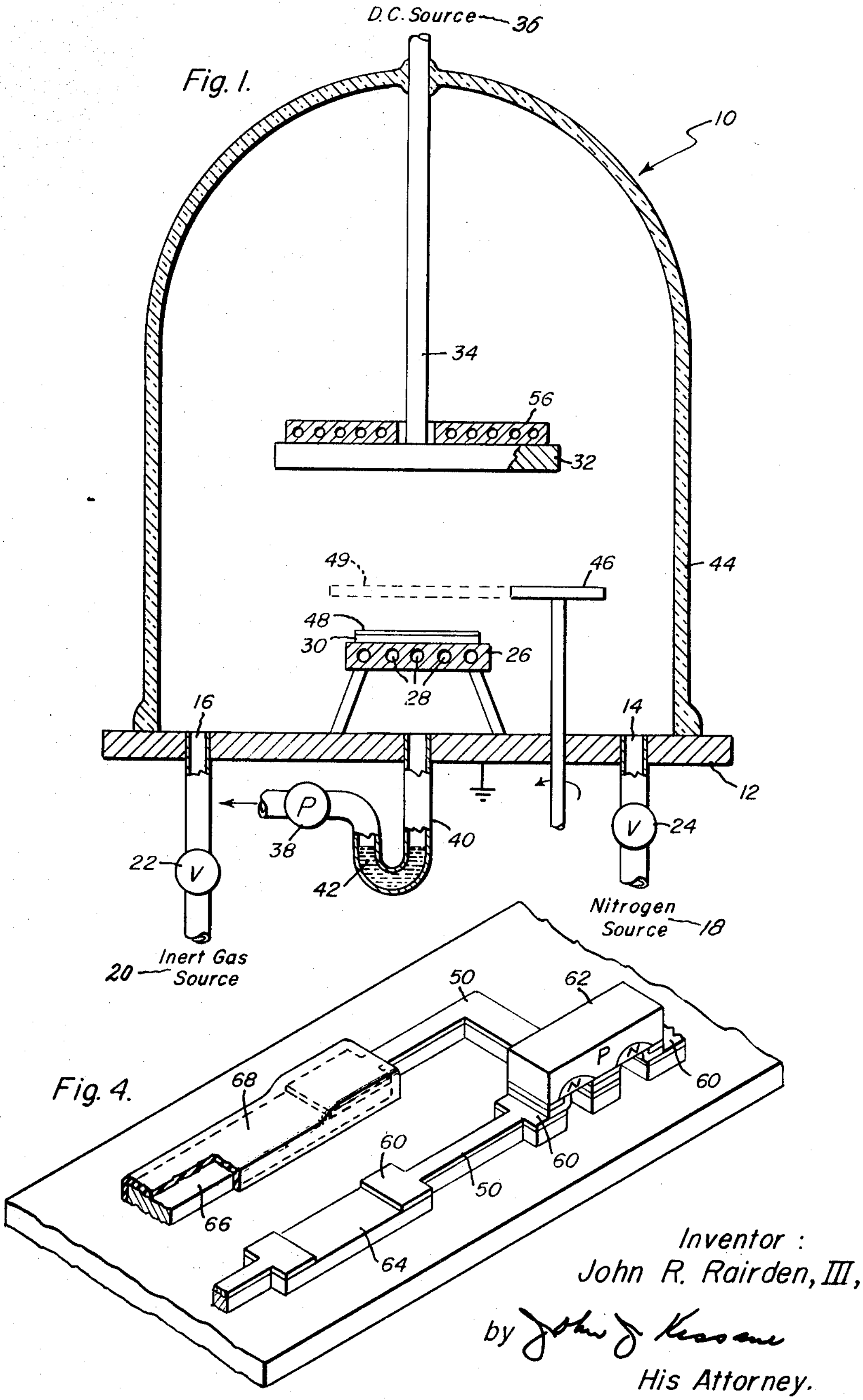

Inventor :
John R. Rairden, III,
by John J. Kissane
His Attorney.

Inventor:
John R. Rairden, III, by [signature]
His Attorney.

REFRACTORY METAL/REFRACTORY METAL NITRIDE RESISTOR FILMS

This invention relates to thin film resistors and to a method of forming such resistors. In a more particular aspect, the invention relates to resistor films consisting essentially of a metal selected from the group consisting of tungsten and molybdenum mixed with the nitride of the selected metal wherein the metal nitride forms at least 5 percent by volume of the film and to a method of forming such resistor films by sputter deposition in a controlled atmosphere.

In fabricating thin film micro-electronic circuits, it is often desirable to incorporate therein discrete resistor films exhibiting both a high electrical resistivity and a low temperature coefficient of resistance. Among film materials heretofore suggested for utilization in such circuits are tungsten resistor films formed by vacuum evaporation as well as resistor films of β-tungsten, (i.e. a material postulated to be a sub-oxide of tungsten having the formula $W_3O$) formed by reactive evaporation in accordance with the teachings of my copending U.S. Pat. application Ser. No. 675,990, filed Oct. 17, 1967, now U.S. Pat. No. 3,504,325 and assigned to the assignee of the present invention. In my similarly assigned copending application Ser. No. 738,563, filed June 20, 1968, there also is described a technique for forming both molybdenum films containing monomolybdenum nitride (MoN) and β-tungsten films by reactive evaporation of molybdenum or tungsten, respectively, in nitrogen containing atmospheres. While the heretofor mentioned films exhibit both a high resistivity and low temperature coefficient of resistance, there still is need for different resistor films exhibiting these desirable electrical characteristics while being ameanable to fabrication with a minimum control of deposition perameters.

It is therefore an object of this invention to provide novel resistor films exhibiting both a high electrical resistivity and a low temperature coefficient of resistance.

It is also an object of this invention to provide novel resistor films capable of being reproducibly fabricated with a minimum control of deposition perameters.

It is a still further object of this invention to provide a novel method of forming refractory metal resistor films.

These and other objects of this invention generally are achieved by a resistor film structure characterized by a non-conductive substrate and an overlying resistor film consisting essentially of a metal selected from the group consisting of tungsten and molybdenum mixed with a nitride of the selected metal wherein the nitride forms at least 5 percent by volume of the resistor film. Resistor films exhibiting an essentially zero temperature coefficient of resistance are mixtures of elemental tungsten or molybdenum with between 40 and 60 percent by volume of the metal nitride.

The refractory metal/refractory metal nitride films of this invention typically can be formed by disposing a cathode of tungsten or molybdenum in a sputtering chamber proximate a non-conductive substrate and introducing into the chamber a mixture of an inert gas and nitrogen to produce a total pressure in the chamber between 1–200 microns with the nitrogen forming between 0.3 and 3.0 percent of the chamber pressure. The cathode then is energized within the gaseous atmosphere of the chamber and a refractory metal/refractory metal nitride resistor film containing at least 5 percent by volume refractory metal nitride is deposited atop the substrate to a thickness between 100 and 10,000 angstroms. When the refractory metal cathode employed for sputtering has a nitrided surface, only an inert gas is required for sputter deposition of the refractory metal/refractory metal nitride resistor film and the electrical characteristics of the deposited film are substantially independent of chamber pressure, substrate temperature and deposition rate.

Figure 2:
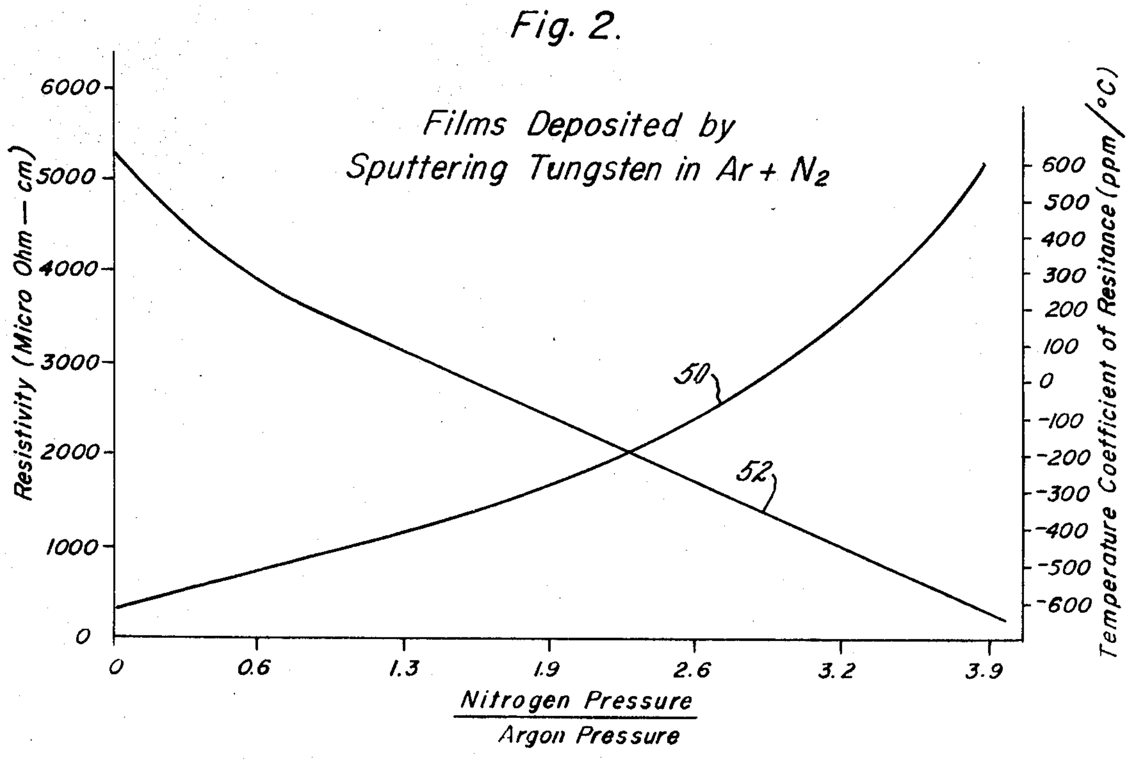
Figure 3:
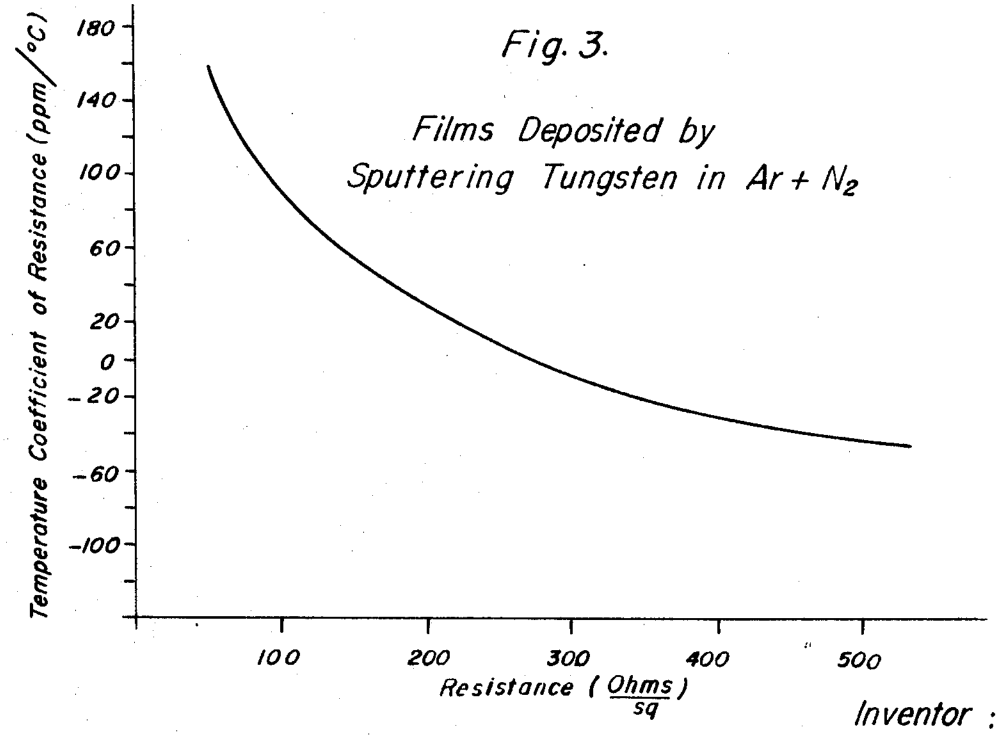

The novel features believed characteristic of the invention are set forth in the appended claims. The invention itself, together with further objects and advantages thereof, may best be understood by reference to the following description taken in conjunction with the accompanying drawings, in which:

FIG. 1 is a sectionalized view of a sputtering chamber suitable for forming the resistor films of this invention, FIG. 2 is a graph illustrating the variation in temperature coefficient of resistance and resistivity with the percentage by pressure of nitrogen employed during sputter deposition of tungsten/tungsten nitride films, FIG. 3 is a graph illustrating the variation in temperature coefficient of resistance with resistance for the tungsten/tungsten nitride films of this invention, and FIG. 4 is an isometric view of refractory metal/refractory metal nitride films formed in accordance with this invention.

A sputtering chamber 10 suitable for forming the refractory metal/refractory metal nitride films of this invention is illustrated in FIG. 1 and generally comprises an electrically grounded metallic base 12 having apertures 14 and 16 communicating the interior of the chamber with nitrogen source 18 and an inert gas source 20 through valves 22 and 24 for the controlled admission of the desired deposition atmosphere into the chamber. Approximately centrally positioned atop the base is a metallic substrate holder 26, i.e. preferably a copper plate having conduits 28 bored therein for circulating a liquid heat transfer medium, to retain substrate 30 in a confronting attitude relative to overlying tungsten cathode 32. The cathode is mechanically supported within chamber 10 by a conductive rod 34 secured to the center of the cathode face remote from the substrate while the opposite end of the rod is connected to a D.C. source 36 for energizing the cathode with the desired sputtering power. Exhaust of chamber 10 both to remove residual gas from the chamber before initiation of sputtering and to provide a continuous circulation of reactive gas therein during sputtering is effected by vacuum pump 38 through conduit 40 with liquid nitrogen trap 42 within conduit 40 serving to isolate the interior of the chamber from external contamination.

To form refractory metal/refractory metal nitride films in accordance with this invention, a substrate 30 previously cleaned with detergent and rinsed in both water and isopropyl alcohol is positioned atop substrate holder 26 at a suitable span, e.g. 2½ inches, from tungsten or molybdenum cathode 36 and, after positioning glass envelope 44 atop base 12, the enclosed chamber is evacuated to a pressure less than $3 \times 10^{-5}$ torr by vacuum pump 38. High purity nitrogen from source 18 then is admitted to the chamber through variable leak valve 24 to raise the pressure of the chamber to an amount between 0.3 and 3.0 percent of the total pressure desired for sputtering, e.g. 1.5 microns nitrogen for a desired sputtering pressure of 80 microns. With shutter 46 rotated to an overlying position relative to the substrate (as illustrated by dotted lines 49), cathode 32 is energized by D.C. source 36 to presputter the cathode in the pure nitrogen atmosphere of the chamber to purge the cathode of residual contamination. A high purity inert gas then is admitted to the chamber from source 20 through variable leak valve 22 to raise the pressure of the chamber to between 1.0 and 200 microns whereupon shutter 46 is rotated from an overlying attitude relative to the substrate permitting the sputter deposition of refractory metal/refractory metal nitride resistor film 48 atop the substrate. Sputtering is continued in the flowing atmosphere of the inert gas and nitrogen until a film having a thickness between 100 and 10,000 angstroms is deposited atop the substrate whereupon energization of the cathode is terminated and the resistor film is allowed to cool to room temperature in the sputtering atmosphere.

When a tungsten cathode is employed as the sputter deposition source for resistor film 48, the deposited resistor film contains elemental tungsten mixed with at least 5 percent by volume tungsten nitride ($W_2N$) with the percentage of tungsten nitride in the deposited film being dependent upon the nitrogen concentration in the deposition atmosphere. Similarly, resistor films of this invention formed utilizing a molybdenum cathode are characterized by a mixture of elemental molybdenum and at least 5 percent by volume $Mo_2N$. The compositions of these films are unexpected in view of the fact that reactive evaporation of tungsten and molybdenum sources in accordance with my heretofore cited U.S. Pat. application Ser. No. 738,563 produced resistor films of β-tungsten and a mixture of molybdenum and monomolybdenum nitride (MoN), respectively.

Substrates 30 employed to accept deposition of the resistor film thereon generally can be any non-conductive material capable of withstanding the elevated temperatures, i.e. temperatures typically between 150° and 350° C., produced by the sputtering process with alumina, glass, fused silica, vitreous enamel, ceramics, etc. being suitable as substrates for the resistor films this invention. When the sputtering power employed for film deposition is low, e.g. 150 watts or less, or when an artificial coolant flowing through conduits 28 in substrate holder 26 is capable of maintaining the substrate at a reduced temperature below 250° C., synthetic materials, such as a polyamide or polypropyleneoxide, also can serve as the substrate.

The atmosphere employed for sputtering preferably is a mixture of an inert gas and nitrogen which is admitted to the chamber at a rate to produce a total sputtering pressure between 1 and 200 microns within the continuously exhausted chamber with the nitrogen gas accounting for between 0.3 and 3.0 percent of the chamber pressure. Argon generally is preferred as the inert gas because of the commercial availability of argon at reduced economic cost although other inert gasses such as helium, krypton, or neon also can be employed. Helium and neon, however, generally are not preferred because the light weight of the gasses results in reduced sputtering rates for a given sputtering power while krypton is relatively expensive. Similarly, although pure nitrogen preferably is employed to nitride the refractory metal ions sputtered from cathode 32, nitrogen bearing gasses, such as ammonia, also can be utilized within sputtering chamber 10 to produce a refractory metal nitride concentration in excess of 5 percent in the deposited resistor film.

In general, the resistivity and temperature co-efficient of resistance of the refractory metal/refractory metal nitride films deposited by the method of this invention were found to be substantially independent of the total gas pressure employed for film deposition with approximately identical resistor characteristics being obtained for films deposited at gas pressures of 80 microns and 35 microns. However, as can be seen from graph of FIG. 2 depicting the resistivity (identified by reference numeral 50) and the temperature coefficient of resistance (identified by numeral 52) of various tungsten films deposited at a rate of approximately 700 angstroms per minute for 5 minutes atop a substrate preheated to 230° C. utilizing a source to substrate distance of 1.5 inches and a power of 2kv. and 20 milliamps per square inch, the resistance characteristics of the deposited films varies markedly with the ratio of nitrogen to inert gas pressure in the system. For example, tungsten/tungsten nitride films having a temperature coefficient of resistance less than approximately 200 parts per million/° C. are obtained only when the nitrogen concentration within the chamber is between approximately 0.8 percent and 2.3 percent of the total deposition pressure while the resistivity of the deposited tungsten/tungsten nitride films increases continuously with increasing percentages of nitrogen in the deposition atmosphere. In general, the composition of the deposited tungsten or molybdenum films also varies with the atmosphere employed for film deposition with pure tungsten or molybdenum films being deposited in a 100 percent inert gas atmosphere while increasing quantities of the dimetal nitride, i.e. $W_2N$ or $Mo_2N$, are present in resistor films deposited in atmospheres containing increasing amounts of nitrogen mixed with the chosen inert gas. For example, traces of tungsten nitride ($W_2N$) are found in films deposited from a tungsten source in a sputtering atmosphere having a nitrogen/argon pressure ratio in excess of 0.6 percent while films having substantially equal amounts of tungsten and tungsten nitride were produced by sputtering in atmospheres having a nitrogen/argon pressure ratio of approximately 1.9 percent. Argon atmospheres containing in excess of 2.4 percent by pressure nitrogen produced predominately tungsten nitride resistor films with only traces of elemental tungsten therein. In general, resistor films having a temperature coefficient of resistance less than 300 p.p.m./° C. were found to contain at least 5 percent of the refractory metal nitride (i.e. $W_2N$ or $Mo_2N$) mixed with the elemental refractory metal forming the remainder of the film while resistor films exhibiting a substantially zero temperature coefficient of resistance were characterized by refractory metal nitride concentrations between 40 and 60 percent in the resistor film.

The cathode employed to form the refractory metal/refractory metal nitride films by sputtering in an argon-nitrogen atmosphere preferably is high purity tungsten or molybdenum which is uncooled during sputtering to permit the cathode to raise to a temperature between approximately 600° and 800° C. Because nitriding of the cathode surface is inhibited by the elevated temperature of the cathode, the resistor characteristics of the deposited films varies with the nitrogen concentration in the chamber in the manner illustrated by the tungsten resistor film curves of FIG. 2. In general, the deposition rate employed for forming the resistor films can vary between 100 and 1,000 angstroms per minute with deposition rates between 400 and 600 angstroms being preferred. A source to substrate span of a few centimeters, e.g. 3 centimeters, to approximately 10 centimeters, desirably is employed for sputtering with substantially shorter spans being acceptable when a magnetic field is applied to the deposition chamber to produce a spiral trajectory in the electrons emitted from the cathode to cause ionization of the sputtering gas. A preferred deposition rate of approximately 500 angstroms per minute can be achieved with a 2.5 inch source to substrate span utilizing an applied power of 150–200 watts for a 5 inch diameter refractory metal cathode.

To assure uniform resistor characteristics throughout the thickness of the deposited film, substrate 30 preferably is kept at an approximately constant temperature throughout sputtering by the passage of a flowing coolant through conduits 28 in substrate holder 26. Cooling of the substrate also enhances the formation of the refractory metal nitride at low nitrogen concentrations with substrate temperatures above 500° C. substantially negating appreciable concentrations of the refractory metal nitride in the deposited resistor film. Thus, although some heating of the substrate, i.e. to approximately 200° C., may be desirable to drive off water and other impurities from the substrate prior to deposition of the resistor film thereon, artificial cooling of the substrate or a deposition rate below 600 angstroms per minute should be employed to inhibit raising the substrate temperature above 500° during sputtering. In general, it has been found that a sputtering power of 480 watts for a 5 inch diameter refractory metal cathode raises the substrate temperature to approximately 315° C. after 5 minutes with a source to substrate span of approximately 2.5 inches.

As can be seen from the graph of FIG. 3, illustrating the variation in temperature coefficient of resistance with resistance for a tungsten/tungsten nitride films deposited in a 35 micron argon/nitrogen atmosphere containing 0.7 percent nitrogen atop a water cooled glazed alumina substrate utilizing a sputtering power of 250 watts for a 2.5 inch source to substrate distance, tungsten/tungsten nitride films of this invention having a temperature coefficient of resistance of 0 p.p.m./°C. exhibit a resistance in excess of 260 ohms per square. Moreover, tungsten/tungsten nitride films having a resistance above 500 ohms per square are characterized by a temperature coefficient of resistance less than 50 parts per million/°C.

After cooling the refractory metal/refractory metal nitride film within the sputtering atmosphere employed for the film deposition, the resistor characteristics of the film can be stabilized by heat treating the film at elevated temperatures in excess of 125° C. For example, the temperature coefficient of resistance of a tungsten/tungsten nitride film was reduced from 114 p.p.m./°C. to 45 p.p.m./°C. by heating the film for 2 hours at 125° C., storing the film in room atmosphere for 5 days and subsequently heating the film for 1½ hours at 250° C. Electrical contact then is made to the resistor film by depositing a conductor, e.g. aluminum, gold, nickel, etc. atop the resistor film and subsequently etching the metal conductor and the underlying resistor film to provide conductive leads 50 and contacts 60 for each discrete resistor of an array as illustrated in FIG. 4. In general aluminum is preferred both for forming contacts to the discrete resistors and conductor runs between the resistors and other components, e.g. transistor 62 of the array, because of the relatively low cost of aluminum and the ability of aluminum to provide good ohmic contact to silicon semiconductive devices. Suitably, the aluminum is deposited atop resistor film 48 by vacuum evaporation of an aluminum source at pressures less than $5 \times 10^{-5}$ torr whereupon the deposited aluminum film is photoetched in a predetermined design utilizing a photoresist mask and an etchant formed by a mixture of 75 percent phosphoric acid, 15 percent acetic acid, 5 percent nitric acid and 5 percent deionized water. The tungsten/tungsten nitride resistor film exposed by the aluminum etch then is selectively removed utilizing a 30 percent hydrogen peroxide solution at room temperature to form discrete resistors, e.g. resistors 64 and 66, without adversely affecting the overlying aluminum conductor. When gold is coated atop the tungsten/tungsten nitride resistor film to form the contacts and the conductor runs of a resistor/conductor network, an approximately 200 angstroms thick nickel strike layer preferably is deposited atop the tungsten/tungsten nitride resistor film prior to deposition of the gold film thereon. The gold film and nickel strike layer then is etched utilizing conventional photoresist techniques and an etchant consisting of one part hydrochloric acid, 3 parts nitric acid, and 2 parts deionized water to form contacts 60 and conductive leads 50 while exposing the underlying resistor film for etching with a 30 percent hydrogen peroxide solution through a photoresist mask. To further inhibit a variation in the refractory metal/refractory metal nitride film resistance, the deposited film can be coated with any conventional encapsulating agent 68, e.g. typically a layer of silicone monoxide, silicon nitride, etc., to isolate the resistor film from the ambient conditions during subsequent operation.

When resistor film 48 is molybdenum/dimolybdenum nitride, an overlying vacuum evaporated aluminum film can be etched with a mixture of 75 percent phosphoric acid, 15 percent acetic acid, 5 percent nitric acid and 5 percent deionized water to form electrical contacts for the resistor film. The molybdenum/dimolybdenum nitride resistor film exposed by the aluminum etch then is divided into discrete resistors utilizing a photoresist mask and an etchant consisting of a 30 percent hydrogen peroxide solution at room temperature.

While the refractory metal/refractory metal nitride films of this invention can be formed on a continuous basis by reactively sputtering a cathode of tungsten or molybdenum in an atmosphere containing nitrogen and an inert gas in a pressure ratio between 0.3 and 3.0 percent, less precise control of the deposition perameters is required when the resistor film is formed by sputtering a tungsten or molybdenum cathode containing at least 5 percent by volume of the metal nitride. Typically, such cathodes can be produced by passing a flowing coolant through plate 56 to retain cathode 32 at a temperature below 500° C. during the initial purging of chamber 10 wherein the refractory metal cathode is energized in an atmosphere containing 0.3 – 3.0 percent nitrogen with shutter 46 is an overlying attitude relative to substrate 30 thereby nitriding the surface of the cooled cathode. Shutter 46 then is rotated from a shielding position and the nitrided cathode can be sputtered in a completely inert atmosphere, e.g. 80 microns argon, to deposit refractory metal/refractory metal nitride film 48 atop the substrate. When a nitrided cathode is employed as the sputtering source, the resistor characteristics of films deposited therefrom are almost entirely independent of the nitrogen concentration in the sputtering atmosphere used to deposit the film. For example, films sputter deposited from a tungsten/tungsten nitride cathode at a pressure of $35 \times 10^{-3}$ torr in atmospheres containing 3 percent, 2 percent, 1.5 percent, 1 percent and 0 percent nitrogen all exhibit substantially identical temperature coefficients of resistance and resistivity characteristics. Moreover, the properties of the deposited films are completely independent of deposition rate and substrate temperatures from 0° to 400° C.

Although the refractory metal/refractory metal nitride resistor films of this invention have been described as being produced by reactive sputtering of a tungsten or molybdenum cathode in an argon/nitrogen atmosphere and by sputtering of a nitrided tungsten or molybdenum surface in an inert or nitrogen containing atmosphere, other techniques (i.e. the formation of cathode 32 from a powder mixture of the refractory metal and refractory metal nitride utilizing powder metallurgy techniques and sputtering the cathode in an inert gas atmosphere) also can be employed to form the resistor films of this invention. By mixing the elemental tungsten or molybdenum with precisely measured quantities of tungsten nitride or molybdenum nitride, desired electrical characteristics are inherently produced in the deposited film without a precise control of such deposition parameters as the inert gas sputtering pressure, deposition rate, etc.

What is claimed is:

1. A thin film resistor structure comprising a non-conductive substrate and a resistor film consisting essentially of a mixture of either tungsten and tungsten nitride or molybdenum and molybdenum nitride deposited on said substrate, said nitride forming at least 5 percent by volume of said resistor film.

2. A thin film resistor structure according to claim 1 wherein said nitride forms between 40 and 60 percent by volume of said resistor film.

3. A thin film resistor structure according to claim 1 further including a metallic film selectively deposited along said resistor film to permit electrical energization of said resistor film and an encapsulating layer deposited atop the juxtaposed films.

4. A thin film resistor structure as set forth in claim 1 wherein said mixture is tungsten and tungsten nitride.

5. A thin film resistor structure as set forth in claim 1 wherein said mixture of molybdenum and molybdenum nitride.

* * * * *